United States Patent
Al Jazaery et al.

(10) Patent No.: US 11,017,217 B2
(45) Date of Patent: May 25, 2021

(54) SYSTEM AND METHOD FOR CONTROLLING APPLIANCES USING MOTION GESTURES

(71) Applicant: MIDEA GROUP CO., LTD., Foshan (CN)

(72) Inventors: Mohamad Al Jazaery, San Jose, CA (US); Suresh Mani, San Jose, CA (US)

(73) Assignee: MIDEA GROUP CO., LTD., Foshan (CN)

( * ) Notice: Subject to any disclaimer, the term of this patent is extended or adjusted under 35 U.S.C. 154(b) by 164 days.

(21) Appl. No.: 16/155,698

(22) Filed: Oct. 9, 2018

(65) Prior Publication Data

US 2020/0110928 A1 Apr. 9, 2020

(51) Int. Cl.
  *G06K 9/00* (2006.01)
  *G06F 3/01* (2006.01)
  *G05B 19/042* (2006.01)

(52) U.S. Cl.
  CPC ....... *G06K 9/00335* (2013.01); *G05B 19/042* (2013.01); *G06F 3/017* (2013.01);
  (Continued)

(58) Field of Classification Search
  None
  See application file for complete search history.

(56) References Cited

U.S. PATENT DOCUMENTS

| 2016/0162039 A1* | 6/2016 | Eilat | G06F 3/005 382/103 |
|---|---|---|---|
| 2017/0192513 A1* | 7/2017 | Karmon | G06K 9/00389 |
| 2018/0097650 A1 | 4/2018 | Lai et al. | |

FOREIGN PATENT DOCUMENTS

| CN | 105353634 A | 2/2016 |
|---|---|---|
| CN | 106054650 A * | 10/2016 |

(Continued)

OTHER PUBLICATIONS

Yang, Seung-Eun, et al. "Advanced soft remote control system in human-friendliness." SCIS & ISIS SCIS & ISIS 2006. Japan Society for Fuzzy Theory and Intelligent Informatics, 2006. (Year: 2006).*

(Continued)

*Primary Examiner* — Vu Le
*Assistant Examiner* — Tracy Mangialaschi
(74) *Attorney, Agent, or Firm* — Morgan, Lewis & Bockius LLP

(57) ABSTRACT

A method and system of controlling an appliance includes: receiving, from a first home appliance, a request to start video image processing for detecting a motion gesture of a user; processing a sequence of image frames captured by a camera corresponding to the first home appliance to identify a first motion gesture; selecting a second home appliance as a target home appliance for the first motion gesture in accordance with one or more target selection criteria, including first target selection criteria based on a location of the user relative to the first home appliance and second target selection criteria based on a level of match between the first motion gesture and a first control gesture corresponding to the second home appliance; and generating a control command to control the second home appliance in accordance with the first control gesture corresponding to the second home appliance.

12 Claims, 5 Drawing Sheets

(52) U.S. Cl.
    CPC ..... *G06K 9/00718* (2013.01); *G06K 9/00758* (2013.01); *G05B 2219/2642* (2013.01)

(56) References Cited

FOREIGN PATENT DOCUMENTS

| | | |
|---|---|---|
| CN | 107168077 A | 9/2017 |
| CN | 107991893 A | 5/2018 |
| WO | WO03027942 A1 | 4/2003 |

OTHER PUBLICATIONS

Midea Group Co. Ltd., International Search Report and Written Opinion, PCT/CN2019/078546, dated Jul. 15, 2019, 11 pgs.

\* cited by examiner

400

```
┌─────────────────────────────────────────────────────────┐
│ Receive, from a first home appliance of a plurality of  │──── 402
│ home appliances, a first request to start video image   │
│ processing for detecting a motion gesture of a user     │
└─────────────────────────────────────────────────────────┘
                            │
                            ▼
┌─────────────────────────────────────────────────────────┐
│ In response to receiving the first request to start     │
│ video image processing for detecting a motion gesture   │
│ of a user, process a sequence of image frames that are  │──── 404
│ captured by a camera corresponding to the first home    │
│ appliance to identify a first motion gesture based on   │
│ spatiotemporal features extracted from the sequence of  │
│ image frames                                            │
└─────────────────────────────────────────────────────────┘
                            │
                            ▼
┌─────────────────────────────────────────────────────────┐
│ Select a second home appliance from the plurality of    │
│ home appliances as a target home appliance for the      │
│ first motion gesture in accordance with one or more     │
│ target selection criteria, including first target       │
│ selection criteria based on a location of the user      │──── 406
│ relative to the first home appliance and second target  │
│ selection criteria based on a level of match between    │
│ the first motion gesture and a first control gesture    │
│ corresponding to the second home appliance              │
└─────────────────────────────────────────────────────────┘
                            │
                            ▼
┌─────────────────────────────────────────────────────────┐
│ Generate a first control command to control the second  │──── 408
│ home appliance in accordance with the first control     │
│ gesture corresponding to the second home appliance      │
└─────────────────────────────────────────────────────────┘
```

Figure 4

SYSTEM AND METHOD FOR CONTROLLING APPLIANCES USING MOTION GESTURES

TECHNICAL FIELD

The present disclosure relates to the field of appliance control, and in particular, to a method and system for controlling home appliances using motion gestures.

BACKGROUND

Home appliances provide various dedicated functions to home users. Each appliance has its own control user interface that is operable via various input modalities, and each appliance provides feedback to the user via various output modalities. User interface design for home appliances is critical in affecting the usage efficiency and user experience when interacting with the home appliances.

Conventional home appliances are controlled by knobs and touch panels. However, touch-based input interface requires the user to be physically present at the home appliance that he/she wants to control, and requires a certain amount of strength and dexterity on the part of the user to accurately control the appliances. A mobility-challenged user (e.g., a bedridden patient, a wheel-chair bound users, elderly user, etc.) may not be able to get to the control panel of an appliance easily (e.g., in a kitchen or other small spaces). Sometimes, a sitting user (e.g., a user sitting on a wheel chair), or a user with a short stature (e.g., a child) may have trouble reaching the control panel of an appliance. Even though a remote controller may help in some instances, if the remote controller is not near the user or cannot be found at the time of need, the user will not be able to control the appliances as needed.

Recently, voice-based digital assistants, such as Apple's SIRI, Amazon's Echo, Google's Google Assistant, and Microsoft's Cortana, have been introduced into the marketplace to handle various tasks such as home appliance controls, web search, calendaring, reminders, etc. One advantage of such voice-based digital assistants is that users can interact with a device in a hands-free manner without handling or even looking at the device. However, sometimes, a voice-based input interface is not useful, e.g., for speech-impaired users, or in a noisy environment. In addition, the speech user interface requires sophisticated natural language processing capabilities, which is difficult to perfect in light of varied accents and speaking habits of users.

Thus, it would be beneficial to provide an alternative system to improve the way that appliances are controlled.

SUMMARY

Accordingly, there is a need for a method to control home appliances using motion gestures. Motion gestures are movement gestures of the user's body (e.g., hands, arms, heads, etc.) without making contact with any input surfaces. The user is able to make the gesture without being very close to the appliance. For example, a user can be in the middle of a room or in bed, and perform the motion gestures to control an appliance that is located away from the user. This is particularly beneficial to users with limited mobility, and allow them to control multiple appliances from the same location in the room. This is also helpful for controlling appliances that are sensitive or dangerous. For example, a user can control the stove with a motion gesture without touching any part of the stove, thus avoiding touching any hot surface on the stove. This is also helpful in situations where the appliance is sensitive to disturbances cause by contact (e.g., a smart fish tank for sensitive or dangerous pets), and a user can control the appliance (e.g., setting internal environment, and release food or water to the pet, etc.) without direct contact with the appliance. This is also helpful in situations where the user does not want to touch the appliance's control panel because the user's hands are contaminated (e.g., the user's hands are web), and the user can control the appliance using motion gestures.

In some embodiments, a method of controlling home appliances via motion gestures, includes: at a computing system having one or more processors and memory: receiving, from a first home appliance of a plurality of home appliances, a first request to start video image processing for detecting a motion gesture of a user; in response to receiving the first request to start video image processing for detecting a motion gesture of a user, processing a sequence of image frames that are captured by a camera corresponding to the first home appliance to identify a first motion gesture based on spatiotemporal features extracted from the sequence of image frames; selecting a second home appliance from the plurality of home appliances as a target home appliance for the first motion gesture in accordance with one or more target selection criteria, including first target selection criteria based on a location of the user relative to the first home appliance and second target selection criteria based on a level of match between the first motion gesture and a first control gesture corresponding to the second home appliance; and generating a first control command to control the second home appliance in accordance with the first control gesture corresponding to the second home appliance.

In accordance with some embodiments, a computer-readable storage medium (e.g., a non-transitory computer readable storage medium) is provided, the computer-readable storage medium storing one or more programs for execution by one or more processors of an electronic device, the one or more programs including instructions for performing any of the methods described herein.

In accordance with some embodiments, an electronic device (e.g., a portable electronic device) is provided that comprises means for performing any of the methods described herein.

In accordance with some embodiments, an electronic device (e.g., a portable electronic device) is provided that comprises one or more processors and memory storing one or more programs for execution by the one or more processors, the one or more programs including instructions for performing any of the methods described herein.

In accordance with some embodiments, an information processing apparatus for use in an electronic device is provided, the information processing apparatus comprising means for performing any of the methods described herein.

BRIEF DESCRIPTION OF THE DRAWINGS

The aforementioned features and advantages of the disclosed technology as well as additional features and advantages thereof will be more clearly understood hereinafter as a result of a detailed description of preferred embodiments when taken in conjunction with the drawings.

To describe the technical solutions in the embodiments of the present disclosed technology or in the prior art more clearly, the following briefly introduces the accompanying drawings required for describing the embodiments or the prior art. Apparently, the accompanying drawings in the following description show merely some embodiments of the present disclosed technology, and persons of ordinary skill in the art may still derive other drawings from these accompanying drawings without creative efforts.

FIG. 4 is a flowchart diagram of a method of controlling a home appliance via motion gestures in accordance with some embodiments.

Like reference numerals refer to corresponding parts throughout the several views of the drawings.

DESCRIPTION OF EMBODIMENTS

Figure 1:
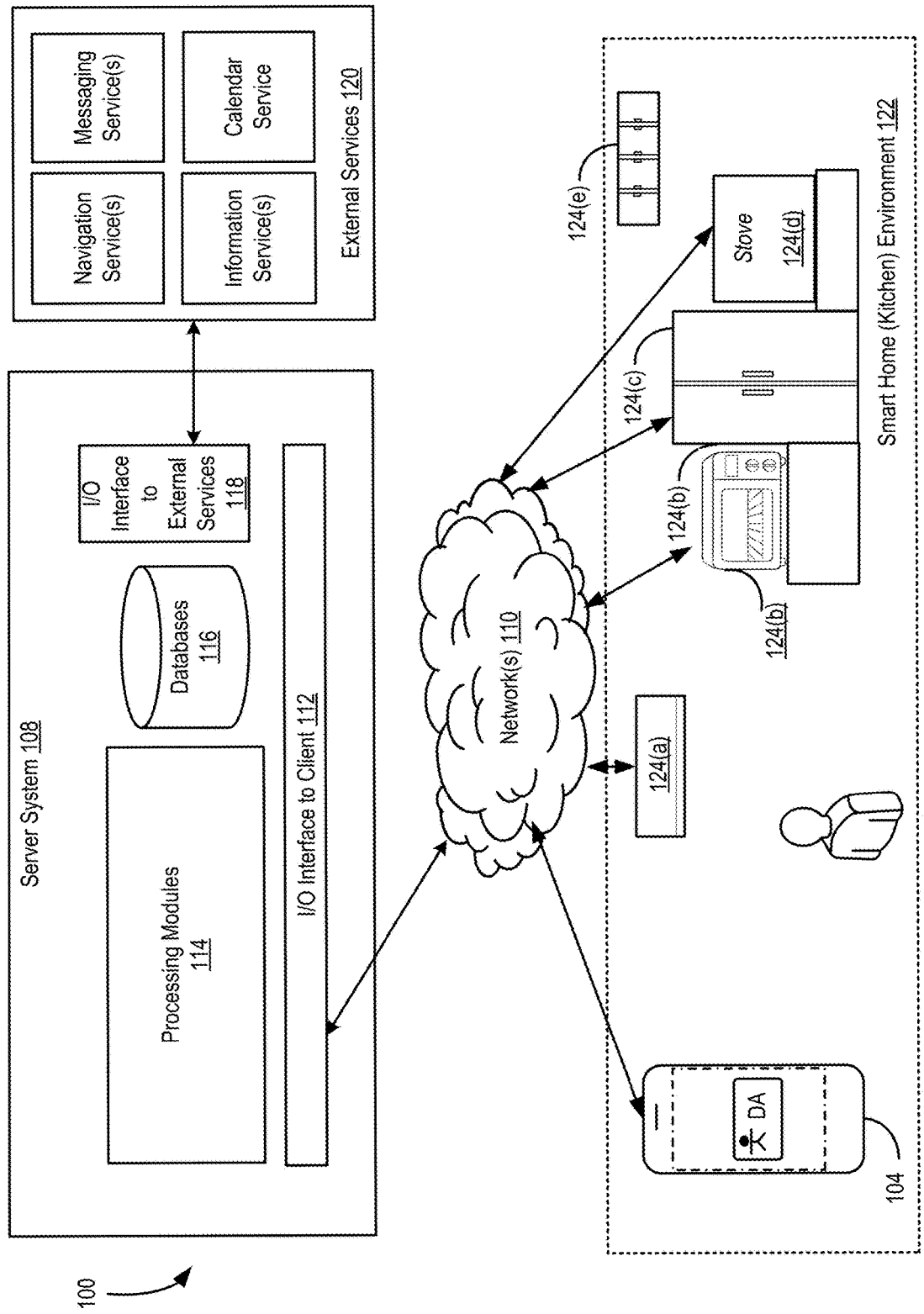
FIG. 1 is a block diagram illustrating an operating environment of one or more home appliances in accordance with some embodiments.

The method and configuration of functions set forth herein address the issues and shortcomings of the conventional methods outline above, and offer at least some of the advantages set forth below. Other advantages will be apparent in light of the disclosure provided herein.

As discussed in the background section, conventional touch-based control for home appliances are not user-friendly in many cases because a user is required to be very close to the appliance (e.g., with the user's hands being in contact with the appliance's control panel in most of the cases). This make it dangerous for the user when the appliance is a hot stove. Also, sometimes, when the user's hands are wet or contaminated with some substances (e.g., raw chick, dirt, slime, oil, etc.), using a touch-based control panel on the appliance or a remote controller (e.g. clicking control buttons on the touch-panel or remote controller) could be unsanitary and cause additional cleaning of the appliance later.

Additionally, a touch-based remote controller can be lost or out of reach in the moment of needs. Therefore, it is advantageous to implement a way to control appliances without requiring a touch-based input on a remote controller.

Conventionally, a voice-based user interface can serve as a touchless alternative to touch-based control user interface. However, a voice-based user interface does not work well in a noisy environment, e.g. when a party is going on in the house. In addition, the voice-based user interface cannot quickly adapt to a new user (e.g., a visitor to the house) that has a different accent, or does not speak the language accepted by the voice-based user interface. Furthermore, for speech-impaired users (e.g., a stroke patient who has slurred speech, or a toddler who does not speak clearly, or a mute person), the voice-based user interface will not work at all.

As disclosed herein, the mid-range dynamic gesture interface is an alternate of the voice-based user interface and the touch-based user interface. The motion gesture user interface provides the following advantages. First, motion gestures are universal, to users of all languages and accents. Motion gestures work well in noisy environments. Motion gestures also work well for people who do not speak (e.g., deaf people or mute people who can use sign languages).

Furthermore, the present disclosure discloses the user of motion gestures, as opposed to static gestures or touch-gestures. Using dynamic gestures instead of static gestures gives allow the user interface to be more realistic and interactive. The motion gestures are determined based on not only a static appearance, but also the motion required to reach a static appearance. In some embodiments, the motion gestures can be implemented based on true sign language, such that the system is easily adapted for use by deaf and mute users.

As disclosed herein, using the camera makes it possible to control appliances with not only hands but also body language. It also makes it possible to control appliances, with not only hands, but also facial and head movement and expressions. This allows people who cannot move their hands to control appliances with motion gestures provided by head movement or face movement (e.g., smiling or make an angry face).

Detecting motion gestures from a reasonable distance away, the mid-range cameras allow the user to stand sufficiently far to control an appliance, which makes it safer and eliminates the need for the user to get close to the appliance.

In some embodiments, when training the image analysis models, gesture video data of the predefined classes of gestures are collected, and a three-dimensional convolutional deep model is trained using the gesture videos. Three-dimensional convolutions have shown state-of-art performance to encode the spatiotemporal information for action recognition and scene classification, as well as gesture recognition. Different from the casual convolutional deep Networks, three-dimensional convolutions can learn simultaneously both the spatial and temporal information. The depth of filter kernel is smaller than the depth of the input volume. As a result, the output feature map has three dimensions and contains features in the spatial and temporal domains, which means learning from the appearance and motion encoded in the consecutive frames.

Figure 3:
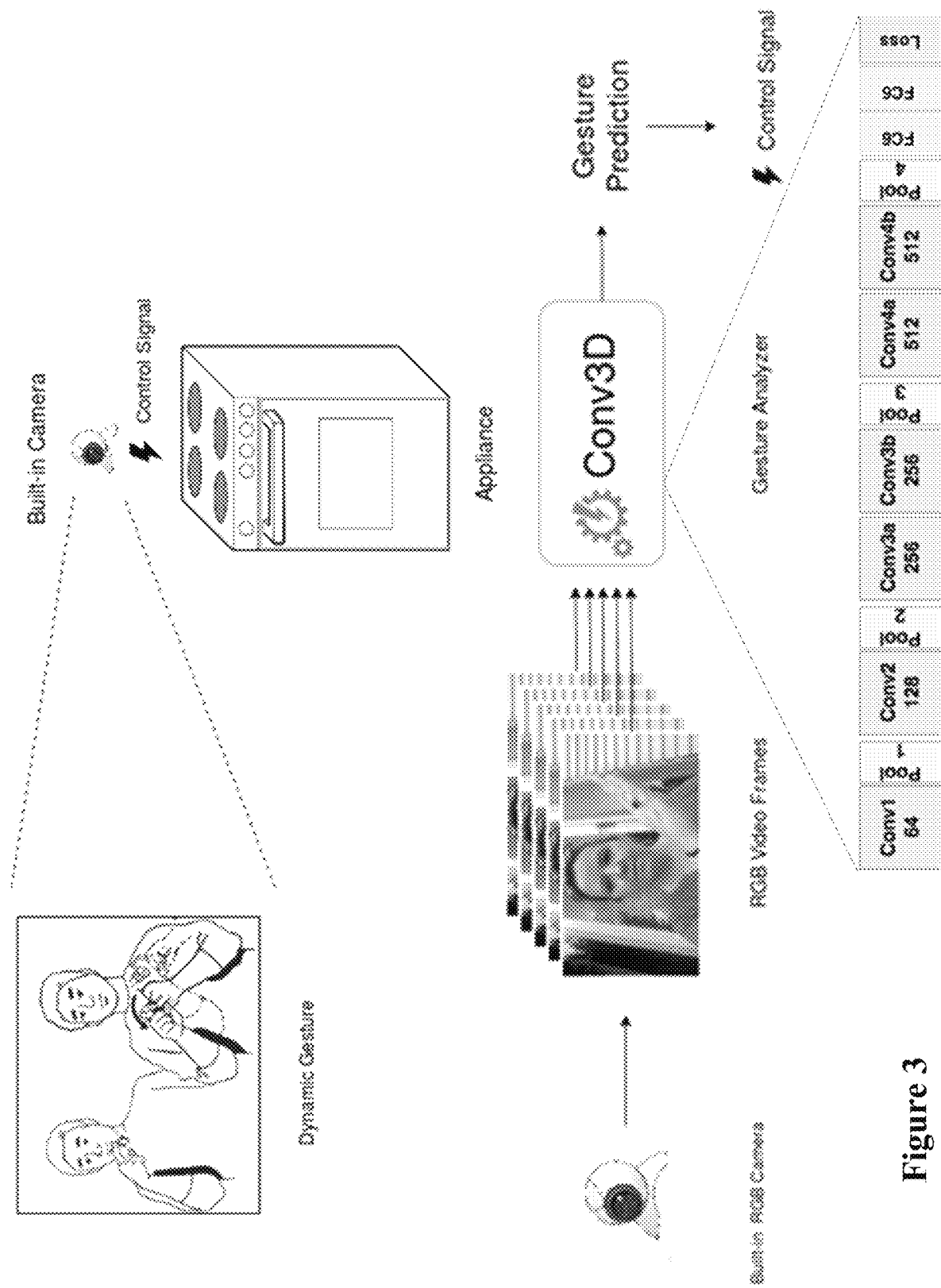
FIG. 3 illustrates a processing pipeline for determining motion gestures from image analysis of a sequence of images in accordance with some embodiments.

As disclosed herein, in some embodiments, a model structure is an augmented Conv3D model that is used to perform the image analysis for motion gesture recognition, as shown in FIG. 3. The augmented Conv3D deep structure includes 6 convolutions, 4 max-pooling layers, 2 fully connected layers, and a softmax loss layer. All convolutional kernels are 3×3×3 with stride 1 in both spatial and temporal dimensions. The input size is 8×56×56 frames where 8 is number of the consequence frames. The order of the layers are: convolution layer 1, max-pooling layer 1, convolution layer 2, max-pooling layer 2, convolution layer 3a, convolution layer 3b, max-pooling layer 3, convolution layer 4a, convolution layer 4b, max-pooling layer 4, fully connected layer 6, fully connected layer 6, and softmax loss layer.

Once a motion gesture is recognized from a sequence of video images using the trained Conv3D model, a corresponding control command is identified and sent to the target appliance. Using built-in camera in the appliance, the augmented Conv3D model determines whether the user's gesture corresponds to any predefined control gestures. Once a control gesture is recognized, a corresponding control signal is sent to the target appliance.

In some embodiments, other gesture recognition techniques may be utilized to recognize a motion gesture performed by a user. For example, a Time of Flight technique is a technique for measuring distances by calculating the propagation time of light. According to the different distances to determine the specific position of different fingers, so as to determine the specific gestures, and then to determine the corresponding control commands. In some embodiments, a 3D camera module is used to emit pulsed light, and a built-in sensor is used to receive the light reflected from the user's hand. Then, according to the time difference between the two, the processing chip can construct the current position and posture of the hand.

Another technique is based on structured light technology. The basic principle of structured light technology is similar to that of time of flight technology, but the difference is that it uses light with patterns such as dots, lines or surfaces. Taking Intel's integrated front-end realistic camera as an example, it includes infrared laser transmitter, infrared sensor, color sensor and image processing chip. The basic principle is as follows: first, the laser transmitter projects the structured light onto the front surface of the human body, and then the infrared sensor is used to receive the reflected pattern of the structured light from the human body. Then, the processing chip calculates the spatial information of the object body according to the position and deformation degree of the received pattern on the camera. Combined with the principle of triangle distance measurement and depth calculation, 3D objects can be identified. The camera sends the collected information to the Software Development Kit (SDK), which combines the acceleration calculator to provide gesture recognition and other functions.

Another technique utilizes millimeter-wave radar. The principle of millimeter-wave radar is the same as that of time of flight technology, except that the medium used to measure changes from light to radio waves. Project Soli uses a built-in millimeter-wave generator to emit radio waves (radar waves) and then receives the echoes using a receiver. At this point, the built-in processing chip will calculate the location data of the target in real time according to the time difference between the transceivers.

As also disclosed herein, utilizing a built-in camera to capture video of a user to control a corresponding appliance is useful. However, sometimes, the user has multiple appliances and multiple appliances may capture the video of the user making the motion gesture at the same time. Sometimes, not all appliances have the built-in cameras to capture the motion gesture, even though the user would like to control all appliances with motion gestures. In this disclosure, the video capturing functions of appliances are shared among multiple appliances (e.g., appliances with cameras and appliances without cameras), and the target appliance for the motion gesture is not necessarily the appliance that captured the video of the motion gesture. Carefully designed way to determine a suitable target appliance for a detected motion gesture is also discussed, such that the motion gestures are made applicable to more appliances, without requiring all appliances to have a camera and video processing capabilities, and without requiring the user to face a particular appliance or move to a particular location in order to control a desired appliance.

Other advantages and benefits of the method and system described herein are apparent to a person skilled in the art in light of the disclosure provided herein.

Reference will now be made in detail to embodiments, examples of which are illustrated in the accompanying drawings. In the following detailed description, numerous specific details are set forth in order to provide a thorough understanding of the subject matter presented herein. But it will be apparent to one skilled in the art that the subject matter may be practiced without these specific details. In other instances, well-known methods, procedures, components, and circuits have not been described in detail so as not to unnecessarily obscure aspects of the embodiments.

The following clearly and completely describes the technical solutions in the embodiments of the present application with reference to the accompanying drawings in the embodiments of the present application. Apparently, the described embodiments are merely a part rather than all of the embodiments of the present application. All other embodiments obtained by persons of ordinary skill in the art based on the embodiments of the present application without creative efforts shall fall within the protection scope of the present application.

FIG. 1 is a block diagram illustrating an operating environment 100 of one or more home appliances in accordance with some embodiments.

The operating environment 100 is optionally implemented according to a client-server model. The operating environment 100 includes a smart home environment 122 (e.g., a smart kitchen of the smart home environment is shown in FIG. 1) and a server system 108 communicatively coupled with the smart home environment 122 via cloud networks 110. In some embodiments, the smart home environment 122 includes one or more smart home appliances 124. Examples of the smart home appliances 124 include refrigerators 124(c), microwave ovens 124(b), smart stoves 124(d), smart storage cabinets 124(e), smart air conditioner 124(a), smart entertainment center, etc. In some embodiments, the client-side environment 100 further includes a user device 104 (e.g., a smartphone, a tablet, a personal computer, or a central communication hub).

As an example, the smart home environment includes a first home appliance, e.g., a smart air conditioner 124(a) that is located on a wall of the kitchen near the ceiling. The smart home environment further includes a second home appliance, e.g., a refrigerator 124(c), that is located between two other smart home appliances, e.g., smart oven 124(d) and smart microwave oven 124(b), all of the three appliances are placed against a wall of the kitchen opposite the air conditioner 124(a).

In some embodiments, a respective appliance of the one or more appliances 124 includes an input/output user interface. The input/output user interface optionally includes one or more output devices that enable presentation of media content, including one or more speakers and/or one or more visual displays. The input/output user interface also optionally includes one or more input devices, including user interface components that facilitate user input, such as a keypad, a voice-command input unit or microphone, a touch screen display, a touch-sensitive input pad, a gesture capturing camera, or other input buttons or controls.

In some embodiments, a respective appliance of the one or more appliances 124 further includes sensors, which senses environment information of the respective appliance. Sensors include but are not limited to one or more light sensors, cameras (also referred to as image sensors), humidity sensors, temperature sensors, motion sensors, weight sensors, spectrometers, and other sensors. In some embodiments, the sensors associated with various appliances are used to provide user presence information (e.g., location of the user in the room, and which appliance(s) that the user is currently interacting with, etc.). In some embodiments, the sensors also provide information on the indoor environment, such as temperature, time of day, lighting, noise level, activity level of the room. This environment information can further be used to select suitable user interface configuration for an appliance, in addition to the recognized motion gestures of the user that is performed in front of the appliance.

In some embodiments, one or more devices and/or appliances in the kitchen area includes a respective camera and a respective motion sensor to detect presence of a user and captures images of the user. The user can move about the smart kitchen environment, and multiple devices 124 that are located in the vicinity of the user can capture the user's images, and independently transmit the images to the server system 108 through their own communication channels to the server.

In some embodiments, the server system 108 includes one or more processing modules 114, data and models 116, an I/O interface to client 112, and an I/O interface to external services 118. The client-facing I/O interface 112 facilitates the client-facing input and output processing for the server system 108. For example, the server optionally provides the image processing services for a particular appliance based on the images submitted by the appliance. The database and models 116 include various user data for each user and/or household of users, such as individual user's account data (e.g., images, age, gender, characteristics, etc.), and user interface configuration preferences and restrictions, etc. The one or more processing modules 114 utilize the data and models 116 to monitor presence of users and motion gestures performed by the users to determine a suitable control command and a suitable target appliance for the control command.

In some embodiments, the server system 108 also communicates with external services 120 (e.g., navigation service(s), messaging service(s), information service(s), calendar services, home appliance control service(s), social networking service(s), etc.) through the network(s) 110 for task completion or information acquisition. The I/O interface to the external services 118 facilitates such communications.

In some embodiments, the server system 108 can be implemented on at least one data processing apparatus and/or a distributed network of computers. In some embodiments, the server system 108 also employs various virtual devices and/or services of third party service providers (e.g., third-party cloud service providers) to provide the underlying computing resources and/or infrastructure resources of the server system 108.

Examples of the communication network(s) 110 include local area networks (LAN) and wide area networks (WAN), e.g., the Internet. The communication network(s) 110 may be implemented using any known network protocol, including various wired or wireless protocols, such as Ethernet, Universal Serial Bus (USB), FIREWIRE, Global System for Mobile Communications (GSM), Enhanced Data GSM Environment (EDGE), code division multiple access (CDMA), time division multiple access (TDMA), Bluetooth, Wi-Fi, voice over Internet Protocol (VoIP), Wi-MAX, or any other suitable communication protocol.

In some embodiments, the image processing functions and user interface configuration adjustment functions disclosed herein are provided remotely by the server 108, or locally by the smart appliances, and/or jointly through a cooperation between the server and the appliances, as described herein.

Figure 2:
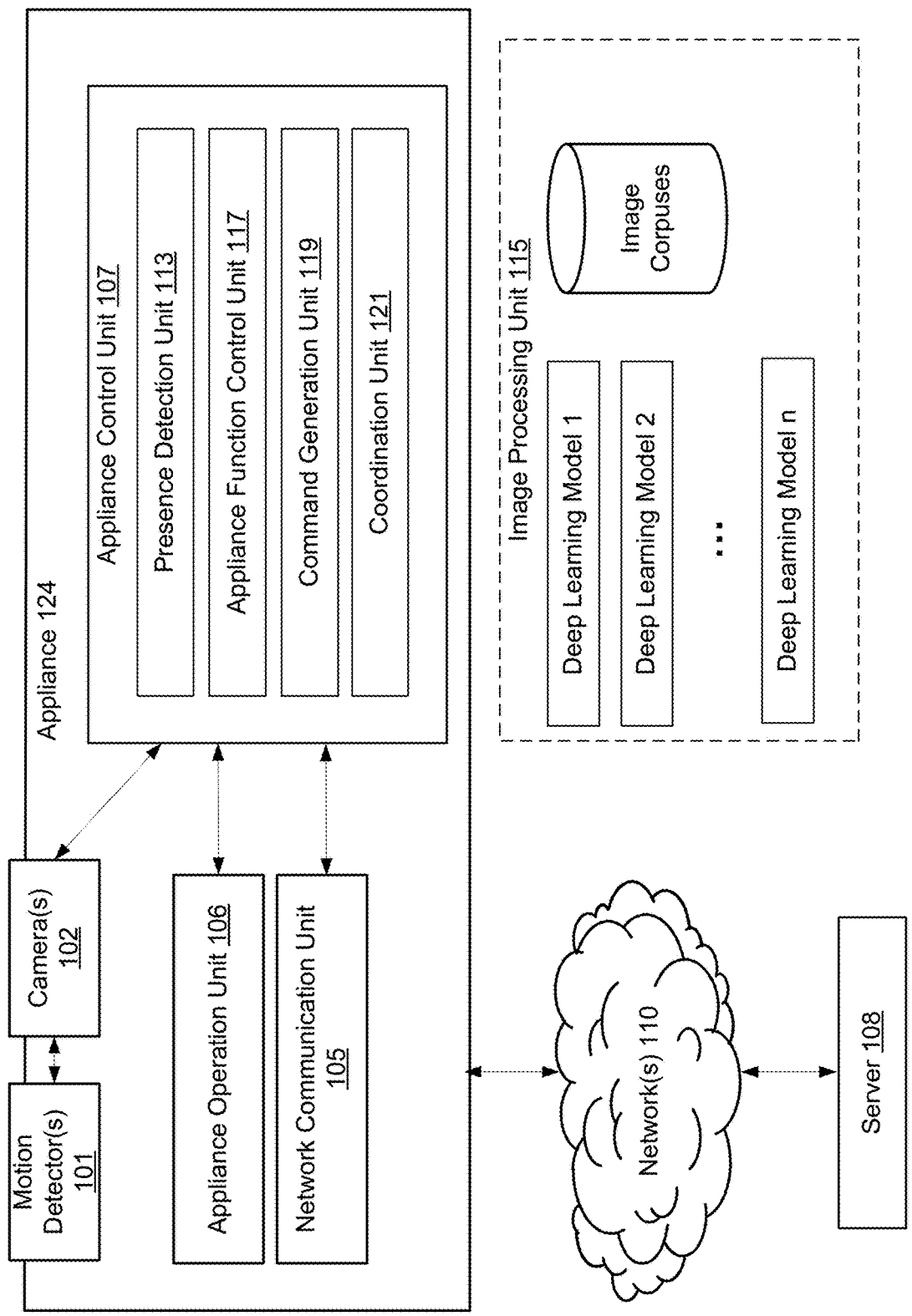
FIG. 2 is a block diagram of an exemplary home appliance in accordance with some embodiments.

As shown in FIG. 2, an exemplary smart appliance 124 (e.g., smart air conditioner 124(*a*), smart refrigerator 124(*c*), smart oven 124(*d*), or smart microwave oven 124(*b*)) includes one or more presence sensors, such as one or more motion detectors 101 and one or more onboard cameras 102, an appliance control unit 107, and an appliance operation unit 106. In some embodiments, the appliance 124 further includes a network communication unit 105 that communicates with a remote server 108 via one or more networks 110 (e.g., a local area network (LAN), a wide area network (WAN), and/or the Internet). In some embodiments, the appliance control unit 107 further includes presence detection unit 113 for controlling the one or more motion detectors 101 and the one or more cameras 102 to detect presence of a user in the vicinity of the appliance 124 and capturing images of the user upon detection presence of the user satisfying preset criteria. In some embodiments, the appliance control unit 107 further includes an appliance function control unit 117 for controlling the appliance operation unit 106. In some embodiments, the appliance control unit 107 further includes a command generation unit 119 for generating a corresponding control command for a target appliance based on the motion gesture(s) deduced from image analysis of the user's images. In some embodiments, the appliance control unit 107 further includes a coordination unit 121 that coordinates the presence detection, image capturing, control command generation and delivery functions of appliances that are associated with one another, or physically near one another, such that the result of the detection, image capturing, analysis, and conclusions of the multiple appliances may be shared and coordinated to reduce power usage, improve analysis accuracy, reducing response time, and improving overall user experience when interacting with multiple appliances in the same room around the same time.

In some embodiments, the appliance control unit 107 further includes an image processing unit 115 which includes one or more machine learning models for analyzing the sequence of images (e.g., consecutive image frames of a video) from the one or more cameras 102, and provide motion gestures deduced from the image analysis performed on the images. In some embodiments, the image processing unit 115 optionally include some components locally at the appliance 124, and some components remotely at the server 108. In some embodiments, the image processing unit 115 is entirely located on the server 108.

In some embodiments, the appliance 124 includes a mechanism for moving and focusing the cameras onto a user's face after the user's presence is detected. For example, the appliance includes a mounting bracket for the cameras that is controlled by one or more motors and actuators, and can change an orientation of the camera(s) (e.g., the tilt and yaw of the camera) relative to the detected user. This can be implemented for a user that will rely on facial movement to control the appliances (e.g., due to inability or diminished ability to move other parts of the body).

In some embodiments, a single camera is placed on the front side of the appliance (e.g., near the center of the upper or lower edge of the front side of the appliance's enclosure). In some embodiments, the camera is mounted on a platform with one or more actuators that are controlled (e.g., controlled via a remote control operated by a user, or controlled automatically by the appliance control unit 104) to change an orientation and/or location of the camera (e.g., by changing the tilt and yaw of the plane of the front-side of the camera, or anchor position of the camera) relative to a reference point (e.g., a fixed point on the front side of the appliance), to provide stereo imaging capability to the appliance 124. In some embodiments, two cameras are placed at two opposing corners of the appliance (e.g., in proximity to the two upper corners of the front side of the enclosure of the appliance, in proximity to the two opposing corners along a diagonal of the front side of the enclosure, etc.) to provide stereo imaging capability to the appliance. In some embodiments, cameras of two appliances that are placed side by side are used to provide stereo image capability to the appliance.

In some embodiments, the camera(s) 102 included on the appliance include image sensors for different wavelengths and/or intensities, such as infrared sensors, visible light sensors, night-vision sensors, and/or motion sensors, etc. In some embodiments, the cameras are operated on a continuous basis and produce continuous streams of image frames. In some embodiments, some cameras (e.g., infrared camera or low-light camera) are activated to capture images when one or more predefined events have been detected in the images captured by other cameras (e.g., visible light camera, etc.). For example, in some embodiments, when the ambient environment is low light (e.g., night), the night-vision camera is only activated to capture an image in response to a detection of a predefined motion event (e.g., more than a threshold amount of movement (e.g., movements less than x minutes apart) of a heat producing object (e.g., a person) for more than a predefined threshold amount of time (e.g., for more than 5 minutes) by the infrared camera.

In some embodiments, appliance 124 includes a user interface 123, the user interface includes input devices of various modalities (e.g., keyboard, touch-screen, microphone, levers, knobs, buttons, camera for capturing motion gestures, haptic interface, etc.) and output devices of various modalities (e.g., displays, speakers, haptic output generators, sirens, lights, indicators, etc.).

In some embodiments, the appliance operation unit 107 includes various hardware mechanisms and components for performing the native functions of the appliance (e.g., for an air conditioner, the components include a compressor, refrigerant, an evaporator, a condenser, an expansion valve, fans, air filters, one or more sensors (e.g., a thermostat, a humidity sensor, an air flow sensor, valve pressure sensors, timers, etc.)).

In some embodiments, the appliance control unit 107 includes one or more processors, and memory. The memory stores instructions which when executed by the one or more processors, cause the processors to perform functions described herein to provide controls to the native functions of the appliance, detecting presence and intent of users in the vicinity of the appliance, determining the user's motion gestures based on user's video images captured in the vicinity of the appliance, identifying the target appliance, generating control command for the target appliance, and coordinating the above functions among multiple appliances in the same vicinity.

In some embodiments, the appliance control unit 107 includes presence detection unit 113. The presence detection unit 113 receives input from motion detectors 101 and determines the distance of a user detected by the motion detector and whether the user movement is toward or away from the appliance based on the output of the motion detector 101. For example, if the motion detector 101 continues to detect motion, and the motion persists within the detection range of the motion detector for at least a threshold amount of time (e.g., 20 seconds), the presence detection unit 113 activates the cameras (102) to start capturing the images in the vicinity of the appliance 124. In some embodiments, the threshold distance of the user for triggering the cameras is the same as the motion detection range of the motion detectors 101. In some embodiments, two motion detectors placed at different locations on the appliance 124, or motion detectors shared by two or more appliances and are located separately on the two or more appliances are used determine the distance and the heading direction of the user detected within the detection range of the motion detectors. In some embodiments, once presence of the user is detected, and image capturing by the cameras 102 is started, the appliance control unit 107 sends the captured images, or portions of the captured images to the image processing unit 115 for motion gesture analysis.

In some embodiments, training of the models can be performed on the server initially, and the trained models are transmitted to the appliance 124 after some time such that the image processing unit 115 performs the image analysis locally for newly captured images. This can reduce server load, and improve privacy protection for the user.

In some embodiments, based on the result of the image analysis, the command generation unit 119 determines whether a motion gesture has been recognized, and determines a suitable target appliance for the motion gesture. The command generation unit 119 also generates the corresponding control signals for the target appliance. In some embodiments, the command generation unit 119 determines the suitable target appliance for the recognized motion gesture based on preset target selection criteria (e.g., based on relative positions of the appliance, the user, and other nearby appliances; and based on the type of motion gesture that is recognized from the users' images).

In some embodiments, the appliance control unit 107 includes a coordination unit 121. The coordination unit 121 is configured to coordinate the motion detection based on inputs from multiple motion detectors distributed among multiple appliances. For example, the motion detector output of the smart air conditioner, the motion detector output of the smart oven, and the motion detector output of the smart refrigerator, etc. are shared among the multiple appliances, such that when motion is detected by one of the multiple devices, the coordination unit 121 on each of the multiple appliances informs its local presence detection unit 113, and which can decide whether to trigger the image capturing of the local cameras, depending on whether the motion is sufficiently close to itself (e.g., the layout of the different motion detectors are shared among the multiple appliances). In some embodiments, by utilizing the multiple motion detectors on different appliances, the motion detection can be performed early enough, such that the delay in image capturing and user interface reconfiguration is reduced to improve user experience. In some embodiments, the coordination unit 121 is configured to coordinate the image capturing from multiple cameras distributed among multiple appliances. Using the images captured by multiple devices at different angles, the chance of capturing the front side of the face is improved, which is beneficial to gesture recognition. In some embodiments, the timing of the image capturing is encoded in the images, such that the movement of the user and which way the user is looking is determined based on the images captured by multiple appliances located at different positions in the room over a period of time (e.g., as the user is moving about the kitchen).

The above examples are provided merely for illustrative purposes. More details of the functions of the appliance 124 are set forth below with respect to the flowchart shown in FIG. 4.

FIG. 3 illustrates an exemplary processing pipeline for processing a sequence of image frames and recognizing motion gestures from the image frames in accordance with some embodiments.

As shown in FIG. 3, when a user is detected in the vicinity of a smart appliance, a video camera (e.g., a build-in camera of a smart stove) is triggered to capture the user's images while the user is performing a motion gesture. Alternatively, the video camera continuously captures images, and the detection of the user's presence and motion causes the newly captured images to be analyzed for motion gesture detection and recognition. A sequence of images is send to the image processing unit 115 as input for a gesture analyzer based on a Conv3D deep learning model that is trained on various types of motion gestures corresponding to different types of appliances. The gesture analyzer extracts spatial-temporal features in the sequence of images and performs motion gesture recognition. The output of the gesture analyzer is used to identify corresponding control gestures for one or more target appliances. Once a suitable target appliance is identified based on various target selection criteria, a control signal (e.g., a control command formatted in accordance with the control protocol of the target appliance) is generated and sent to the target appliance.

In some embodiments, an exemplary process for selecting a target appliance for a motion gesture recognized from a video captured by a camera collocated with a first appliance (e.g., a camera corresponding to the first appliance or built into the first appliance). First, it is determined whether the request for motion gesture analysis that was received from the first appliance specified a target appliance. In accordance with a determination that the request includes the target identity (e.g., the request specifies the target appliance (e.g., based on user's utterance, or other inputs)), it is verified whether the motion gesture that has been recognized is within the set of control gestures corresponding to the specified target appliance. If not, an error alert is generated and the error feedback is provided to the user (e.g., output by the first appliance). If the recognized motion gesture is within the set of control gestures corresponding to the specified target appliance, a control command is generated for the specified target appliance in accordance with the control protocol of the specified target appliance. In accordance with a determination that the request did not include the target identity, it is determined whether the first appliance is the closest appliance to the user among multiple appliances in the same vicinity of the user. In accordance with a determination that the first appliance is the closest appliance to the user among the multiple appliances, it is then verified whether the recognized motion gesture is within the set of control gestures corresponding to the first appliance. If the recognized motion gesture is within the set of control gestures corresponding to the first appliance, a control command is generated for the first appliance in accordance with the control protocol of the first appliance. In accordance with a determination that the first appliance is not the closest appliance to the user among the multiple appliances, it is then determined whether the recognized motion gesture is within the set of control gestures corresponding to any of the other appliances in the same vicinity of the user. If the recognized motion gesture is within the set of control gestures corresponding to one or more other appliances among the multiple appliances, a respective one of the one or more appliances that is closest to the user is selected as the target appliance and a control command is generated for the first appliance in accordance with the control protocol of that selected appliance. If the recognized motion gesture is not within the set of control gestures corresponding to any of the multiple appliances, an error is generated and an error alert is output by the first appliance.

The above target selection process is merely illustrative and the order of the operations may be adjusted in various embodiments based on the actual usage scenarios.

FIG. 4 is a flowchart of a method 400 of controlling home appliances via motion gestures, in accordance with some embodiments. Method 400 is performed by a computing system having one or more processors and memory. For example, in some embodiments, the computing system is a control unit of a first home appliance. In some embodiments, the computing system is a server that is communicably coupled to the first home appliance (e.g., a remote server provided by the manufacturer or third-party service provider of the first home appliance, or a server of a smart home environment).

In method 400, the computing system receives (402), from a first home appliance (e.g., a smart refrigerator or a stove that is equipped with video capturing capabilities) of a plurality of home appliances (e.g., a number of different smart appliances in a smart home), a first request to start video image processing for detecting a motion gesture of a user. For example, the motion gesture is a gesture based on movement of the user's body or certain parts of the body (e.g., user's hand, arm, head, etc.) independent of a contact surface (e.g., touchpad, touch-screen, mouse, joystick, etc.), a touch-less gesture, sign language gestures, etc.). In some embodiments, the first request was triggered by the user at the first home appliance by an input (e.g., a voice input or a specially designated "wake-up" gesture (e.g., wave hand from left to right and back to the left) or sound (e.g., three claps)). In some embodiments, the first request was initiated by the first home appliance when the first home appliance detects presence of the user within a threshold range of the first home appliance or a predefined portion of the first home appliance.

In method 400, in response to receiving the first request to start video image processing for detecting a motion gesture of a user, the computing system processes (404) a sequence of image frames that are captured by a camera corresponding to the first home appliance to identify a first motion gesture based on spatiotemporal features extracted from the sequence of image frames. In some embodiments, the images are streamed to the computing system immediately after the first request to start video image processing is acknowledged by the computing system. In some embodiments, the sequence of images are processed using a Conv3D image processing neural network.

In method 400, the computing system selects (406) a second home appliance from the plurality of home appliances as a target home appliance for the first motion gesture in accordance with one or more target selection criteria, including first target selection criteria based on a location of the user relative to the first home appliance and second target selection criteria based on a level of match between the first motion gesture and a first control gesture corresponding to the second home appliance. In some embodiments, the second home appliance and the first home appliance are optionally the same appliance device or the second home appliance and the first home appliance are different home appliance devices, depending on which target selection criteria are met. In some embodiments, the first target selection criteria are used to trigger selection of the first requesting home appliance (e.g., the first home appliance that captured the images and sent the first request) as a default target home appliance if the user is located within a first threshold range (e.g., a close-distance range) of the first home appliance and is closer to the user than other home appliances in the plurality of home appliances). In some embodiments, the first target selection criteria are used to trigger selection of another home appliance (e.g., the second home appliance that is not the one that captured the images and sent the first request) as a target home appliance if at least one of a plurality of exception conditions are met. In some embodiments, the motion gesture recognized from the sequence of images may be associated with a respective confidence value, and the motion gesture with the highest confidence value is used as the first motion gesture. Each home appliance is associated with a set of control gestures that is recognizable by the Conv3D image processing neural network. Multiple home appliances may be associated with the same control gesture for different appliance functions that are specific to the appliances. Various techniques are used to determine which appliance is the target appliance, if the motion gesture that has been recognized from the sequence of images is a control gesture for multiple different appliances).

In method 400, the computing system generates (408) a first control command to control the second home appliance in accordance with the first control gesture corresponding to the second home appliance. For example, each appliance has a set of control commands that can be triggered by corresponding control gestures, and if the first motion gesture recognized from the sequence of images match a first control gesture corresponding to the second home appliance, the control command in the set of control commands for the second home appliance that corresponds to the first control gesture is the control command used to control the second appliance device.

In some embodiments, the first request to start video image processing for detecting a motion gesture of a user is generated by the first home appliance in response to a predefined sound input detected by the first home appliance. For example, the first home appliance is a smart oven or a smart refrigerator equipped with a camera and a microphone, and the camera is turned off or in a paused state by default (e.g., to conserve energy and protect privacy needs of the user) while the microphone is set to detect audio triggers (e.g., three claps or other audio signals). In some embodiments, the sound signals captured by the microphone is not processed as speech, and is only processed to determine if they meet predefined trigger signal pattern (e.g., wave pattern corresponding to three claps) for triggering the activation of the video recording by the camera and sending of the first request for video image processing by the first appliance device. In some embodiments, the first home appliance is equipped with some limited natural language processing capabilities to recognize a wake up word, such as "Gesture Ready" or a wake up word followed by a name or alias of a home appliance, such as "Gesture Ready, oven" or "Gesture Ready, stove", "Gesture Ready Microwave" "Gesture Ready, AC", "Gesture Ready, Washer", etc. The audio trigger without requiring semantic natural language processing ensures that the user's privacy is protected, and that no recording of the user's speech needs to be uploaded to a server and processed on the server. Also, there is no need to implement complex natural language processing models and there is no requirement that the user possesses the ability to speak clearly or give complicated voice commands. In some embodiments, the appliance allows the user to set up the trigger sound signal based on his/her own needs, e.g., the sound of banging on the armrest of a wheelchair with a special rhythm, or a special whistle sound, or a particular way of speaking a keyword by a speech-impaired user. In some embodiments, after the first home appliance detects the required sound input from the user, the first home appliance activates the camera and the camera starts recording video of the user in front of the camera. The user will move his/her arms or hands in front of the camera to provide the motion gesture for the control command that he/she wishes to be send to a particular appliance (e.g., the first home appliance or another appliance). The first home appliance also sends the first request to the server (e.g., a central processing unit in the house (e.g., in the Local Area Network) or a remote server (e.g., over a Wide Area Network)). In some embodiments, if the identity of the target appliance is provided in the predefined sound input, the identity is extracted from the sound input by the first home appliance and sent to the server with the first request. In some embodiments, if the identity of the target appliance is omitted from the predefined sound input, the default target appliance is the first home appliance that captured the sound input. In some embodiments, if the identity of the target appliance is omitted from the predefined sound input, the target appliance is determined based on other criteria. In some embodiments, the first home appliance omits the identity of the target appliance from the first request if the first home appliance determines that the target appliance is not specified in the sound input. In some embodiments, if the user omits the identity of the target appliance from the sound input, the first home appliance also requests the server to process the sequence of images to determine the identity of the target appliance from the motion gestures recognized from the sequence of images.

In some embodiments, the first request to start video image processing for detecting a motion gesture of a user is generated by the first home appliance in response to a predefine wake-up motion gesture detected by the first home appliance. In some embodiments, the first home appliance is equipped with a camera and limited video processing capability to recognize a "wake-up" motion gesture in the video input. In some embodiments, a small motion gesture recognizer (e.g., a specialized Conv3D gesture recognizable specially trained on just the wake-up gesture, and none of the actual motion gestures for appliance-specific control commands) is built-into the first home appliance, such that even though the video recording is ongoing, the video is not uploaded to the server until the first home appliance recognizes that the video includes the wake-up motion gesture. In some embodiments, after the first home appliance detects the required wake-up motion gesture from the user, the first home appliance starts streaming the video to the server and request the server to process the video stream for additional motion gestures for appliance control. The user will move his/her arms or hands in front of the camera to provide the motion gesture for the control command that he/she wishes to be send to a particular appliance (e.g., the first home appliance or another appliance). In some embodiments, the first home appliance continues to stream the images until the server sends a stop signal to it, because the server has identified a stop motion gesture in the streaming images. In some embodiments, the first home appliance includes the capability to identify the stop motion gesture in addition to the wake-up motion gesture and continues to process the streaming images until the predefine stop motion gesture is detected. Once the stop motion gesture is detected, the first appliance stops streaming the images to the server and start to process the subsequently recorded images for the wake-up gesture again.

In some embodiments, the first request to start video image processing for detecting a motion gesture of a user is generated by the first home appliance in response to detecting the user within a predefined threshold range of the first home appliance. For example, the first home appliance is equipped with a motion detector and a camera. The camera is inactive by default, but is activated by the motion detector when the motion detector detects motion within a threshold range of the first home appliance. For example, the motion detector is installed on an upper corner on the door of a smart oven, and has a small motion detection range of 10 centimeters. The user must wave his/her hand in front of the motion detector within 10 centimeters, in order to trigger the motion detector and cause it to activate the video camera. Once the video camera is activated, the user can perform the motion gestures corresponding to the desired appliance identity and/or control commands in front of the video camera, and the first home appliance also start to send the first request to the server and start to stream the video images captured by the video camera, such that the server can process the streaming images to determine what motion gestures are provided by the user. All of the above methods allow the user to trigger the activation of camera and/or sending of video images to the server for motion gesture recognition by some deliberate actions that do not involve touch or sophisticated natural language processing, enabling usage of the appliances with motion gestures, and without requiring touching any particular surface or special hand-eye coordination for selecting user interface controls or articulation of voice commands in natural language. This is suitable for users in special circumstances where the user cannot come to a touch-input device, or does not wish to touch any surface to contaminate the surface, and does not want to speak required voice commands (e.g., due to need for maintaining a quiet environment or some speech impairment). In some embodiments, touch-input interface and speech input interface are optionally provided, but are selectively disabled under certain conditions (e.g., when the user is identified (e.g., through facial recognition or special tagging device) to be speech-impaired or does not have sufficient dexterity to operate a touch-screen user interface device, or when the user provides the required wake-up gesture or sound input, or when the user is detected to be sufficiently far away from any touch-based input devices).

In some embodiments, in response to receiving the first request to start video image processing for detecting a motion gesture of a user, the computing system processes the sequence of image frames that are captured by the camera corresponding to the first home appliance to identify a second motion gesture based on spatiotemporal features extracted from the sequence of image frames, wherein the second motion gesture is identified before the first motion gesture, and the second motion gesture corresponds to an identifier of the second home appliance. For example, in some embodiments, the sequence of images streamed from the first home appliance is continuously fed into the Conv3D neural network, and the first subsequence of images correspond to a motion gesture corresponding to the appliance identity "AC", as a result, the air conditioner is recognized as the target for the subsequently detected motion gesture. If the subsequently detected motion gesture corresponds to both a control command "Turn off" for the air conditioner and a control command "Turn down" for the oven, the computing system selects the air conditioner as the target appliance and generates the control command "turn off" for the air conditioner. In contrast, if the initially recognized motion gesture corresponds to the appliance identity "oven", then the computing system selects the oven as the target appliance, and generates the control command "turn down" for the oven. In some embodiments, if the identity of the target appliance is specified in the motion gestures detected from the sequence of images, the target appliance specified by the motion gesture is used, instead of target appliance selected based on other target selection criteria.

In some embodiments, one or more target selection criteria includes third selection criteria based on explicit identification of the target home appliance by the user (e.g., in a motion gesture provided before the control motion gesture) and the third selection criteria override the first selection criteria based on user location. In some embodiments, if there is a conflict between the result of the second selection criteria and the third selection criteria (e.g., when the user has specified the identity of the target appliance to be the air conditioner (e.g., using the second motion gesture), but the first motion gesture identified from the sequence of images do not match any control gestures corresponding to the oven (e.g., the first motion gesture matches a control gesture for the air conditioner, or not match the control gesture of any appliance), the computing system generates a failure feedback and sends it back to the first home appliance to present to the user (e.g., flashing lights on the camera, or a beep sound)). The failure feedback prompts the user to restart the motion gesture sequence.

In some embodiments, in addition to receiving the first request to start video image processing for detecting a motion gesture of a user from the first home appliance, the computing system receives, from a third home appliance (e.g., a smart refrigerator or a stove that is equipped with video capturing capabilities) of a plurality of home appliances (e.g., a number of different smart appliances in a smart home) a second request to start video image processing for detecting a motion gesture of a user. For example, the motion gesture is a gesture based on movement of the user's body or certain parts of the body (e.g., user's hand, arm, head, etc.) independent of a contact surface (e.g., touchpad, touch-screen, mouse, joystick, etc.), a touch-less gesture, sign language gestures, etc. In some embodiments, the request was triggered by the user at the third home appliance by an input (e.g., a voice input or a specially designated "wake-up" gesture (e.g., wave hand from left to right and back to the left) or sound (e.g., three claps)), or the second request was initiated by the third home appliance when the first home appliance detects presence of the user within a threshold range of the third home appliance or a predefined portion of the third home appliance. In some embodiments, the first request and the second request were received at substantially the same time (e.g., the user simultaneously satisfied the trigger conditions for starting the motion gesture control process at both the first home appliance and the third home appliance by the same action(s) or presence). For example, this situation may occur when the first home appliance and the third home appliance both captured the wake-up sound signal, or both detected the presence of the user within its threshold range, etc. In order to determine which home appliance the user actually intended to use to capture and transmit the motion gesture, the computing system requires the first and third home appliances to transmit the trigger signal they captured to the computing system (e.g., along with the requests they sent) for the computing system to evaluate, in some embodiments. In some embodiments, the computing system analyzes the sound inputs detected by the first and the third home appliance, and chooses the home appliance that has the best quality sound input from which to accept the subsequent video stream transmission. In some embodiments, the computing system requires the first and third home appliances to transmit the first frame of the video they captured to the computing system (e.g., along with the requests they sent) for the computing system to evaluate, in some embodiments. In some embodiments, the computing system analyzes the first frame of the video sent by the first and the third home appliance, and chooses the home appliance that has captured a front facing image of the user from which to accept the subsequent video stream transmission. For example, the computing system analyzes the respective first image frame sent with the first and second requests, and detects a front-facing user image in the first image frame sent by the first home appliance and a side-facing user image in the first image frame sent by the third home appliance, and as a result, the computing system accepts the first request and starts to receive subsequent image frames from the first home appliance, and the computing system rejects the second request and does not receive subsequent image frames from the third home appliance. In this manner, the computing system ensures that the image streams capture the user's motion gestures properly, and avoids unnecessary transmission of user images from other appliances that the user did not intend to use as the image capturing device for the motion gesture processing.

In some embodiments, the first request includes a respective image frame (e.g., an initial image frame) of a first video captured at the first home appliance, and the second request includes a respective image frame (e.g., an initial image frame) of a second video captured at the third home appliance. In method 400, in response to receiving the first request and the second request: the computing system processes the respective image frames received in the first and second requests. The computing system accepts the first request and accepting transmission of the first video as the sequence of image frames in accordance with a determination that the respective image frame received in the first request includes a front-facing user image. For example, the computing system performs facial image processing on the received initial image frame to determine that the image frame contains a front-facing user image in the center of the image frame. The computing system rejects the second request and rejecting transmission of the second video from the second home appliance in accordance with a determination that the image frame received in the second request does not include a front-facing user image. For example, the computing system performs facial image processing on the received initial image frame to determine that the image frame does not contain a front-facing user image in the center of the image frame (e.g., instead contains no facial image or a side-facing or back-facing user image). In some embodiments, the computing system sends a rejection signal to the third home appliance, and the third home appliance stops video recording and returns the video camera to a dormant state to wait for the next trigger input.

In some embodiments, the second home appliance and the first home appliance are the same home appliance. For example, the user can trigger the motion gesture control process at the smart oven, and perform the motion gesture in front of the camera of the smart oven, and the smart oven is the appliance that captures the video, sends the request, receives the control instruction, and executes the control function.

In some embodiments, the second home appliance and the first home appliance are two distinct home appliances. For example, the user can trigger the motion gesture control process at the smart oven, and perform the motion gesture in front of the camera of the smart oven, and the smart oven is the appliance that captures the video, sends the request. But the control gesture is for controlling the air conditioner, and the air conditioner is the appliance that receives the control instruction, and executes the control function. In some embodiments, the computing system assumes that the target appliance is the first home appliance by default, and the computing system will start the process for determining an alternative target appliance in response to receiving a special user input (e.g., such as a special starting motion gesture or predefined sound input that is included in the first request).

In some embodiments, to select the second home appliance from the plurality of home appliances as the target home appliance for the first motion gesture in accordance with one or more target selection criteria, the computing system, in response to receiving the first request, determines whether the first request includes identification data of the target appliance, and the computing system selects the second home appliance from the plurality of home appliances as the target home appliance for the first motion gesture in accordance with a determination that the identification data of the target appliance included in the first request corresponds to the second home appliance. For example, the identification data includes a sound signal or speech signal, or an appliance identifier that uniquely identifies the second home appliance from the plurality of home appliances. In some embodiments, the computing system processes the identification data (e.g., natural language processing or other decoding of information) to determine which appliance the identification data corresponds to among the plurality of appliances.

In some embodiments, to select the second home appliance from the plurality of home appliances as the target home appliance for the first motion gesture in accordance with one or more target selection criteria, the computing system determines (e.g., in situations where identification data of the target appliance is not included in the first request) a subset of home appliances among the plurality of appliances that have valid control gestures matching (e.g., matching according to a first threshold level of confidence value (e.g., a high threshold for accurate matching=90% confidence) of the gesture recognition result) the first control gesture identified from the sequence of image frames. The computing system selects the second home appliance from the plurality of home appliances as the target home appliance for the first motion gesture in accordance with a determination that the second home appliance is among the subset of home appliances that have valid control gestures matching the first control gesture in conjunction with a determination that the second home appliance is located closest to the user among the subset of home appliances. For example, when the first home appliance is located closest to the user among two or more appliances that can be validly controlled by the first motion gesture, the first home appliance is chosen as the target appliance for the first motion gesture. If another home appliance is located closest to the user among two or more appliances that can be validly controlled by the first motion gesture, then that other home appliance is chosen as the target appliance for the first motion gesture, despite the fact that the first home appliance is the one capturing the video, and despite the fact that the first home appliance may be closest to the user (e.g., because the first home appliance not among the appliances that can be validly controlled by the first motion gesture), and despite the fact the first home appliance may be among the subset of appliances that can be validly controlled by the first motion gesture (e.g., because the first home appliance is not the closest appliance to the user among the subset of appliances).

In some embodiments, to select the second home appliance from the plurality of home appliances as the target home appliance for the first motion gesture in accordance with one or more target selection criteria, the computing system determines (e.g., in situations where identification data of the target appliance is not included in the first request) a subset of home appliances among the plurality of appliances that have valid control gestures matching (e.g., matching according to a second threshold level of confidence value of the gesture recognition result (e.g., a low threshold for rough matching=70% confidence)) the first control gesture identified from the sequence of image frames. The computing system selects the second home appliance from the plurality of home appliances as the target home appliance for the first motion gesture in accordance with a determination that the second home appliance is among the subset of home appliances that have valid control gestures matching the first control gesture in conjunction with a determination that the second home appliance has a higher matching confidence as compared to other home appliances in the subset of home appliances. For example, if the first motion gesture is recognized with 80% confidence as a "turn-off" control gesture for the air conditioner, and also recognized with 75% confidence as a "shut down" control gesture for the oven, both are above the 70% threshold set for inclusion in the subset of appliances, and the air conditioner will be chosen as the target appliance and the "turn-off" command will be sent to the air conditioner.

In some embodiments, to select the second home appliance from the plurality of home appliances as the target home appliance for the first motion gesture in accordance with one or more target selection criteria, the computing system determines (e.g., in situations where identification data of the target appliance is not included in the first request) a subset of home appliances among the plurality of appliances that have valid control gestures matching (e.g., matching according to a third threshold level of confidence value of the gesture recognition result (e.g., a medium threshold for matching=80%)) the first control gesture identified from the sequence of image frames. The computing system selects the second home appliance from the plurality of home appliances as the target home appliance for the first motion gesture in accordance with a determination that the second home appliance is among the subset of home appliances that have valid control gestures matching the first control gesture in conjunction with a determination that the second home appliance has a higher combined score based on matching confidence and distance away from the user as compared to other home appliances in the subset of home appliances. For example, if the first motion gesture is recognized with 80% confidence as a "turn-off" control gesture for the air conditioner, and also recognized with 89% confidence as a "shut down" control gesture for the oven, both are meet the threshold set for inclusion in the subset of appliances, and the air conditioner or the oven may be chosen as the target appliance depending on where the user is standing relative to the oven and the air conditioner. If the user is standing much closer to the air conditioner than the oven, there is a possibility that the overall score will be higher for the air conditioner based on the shorter distance, even with the lower confidence value of the air conditioner.

In some embodiments, to generate the first control command to control the second home appliance in accordance with the first control gesture corresponding to the second home appliance, the computing system selects the first control command from a set of control commands of the second home appliance, wherein each of the set of control commands have a corresponding control gesture, and the first control command corresponds to the first control gesture. The computing system generates the first control command based on control protocols of the second home appliance. For example, the control command for different models or types of smart ovens may have different control protocols, and the same control command of "turn-off oven" will be generated in accordance with different control protocols that are specific to the oven model and make, such that the control command will be executable by the second home appliance properly. In some embodiments, the control protocols, control commands, and corresponding control gestures are stored by the computing system during a setup stage, where the user specifies which gestures should correspond to which command for a particular appliance, and the computing system will download the corresponding machine commands for those specified control commands. In some embodiments, the user will only want to use gestures to control a few frequently used control functions for each appliance rather than other more complex functions or all functions.

In some embodiments, the computing system sends the first control command to the second home appliance via a local area network, wherein the second home appliance executes the first control command. For example, the user may provide the control gesture for turning off the oven in front of the refrigerator, and have the control command "turn off" sent to the oven, and the oven will turn itself off by executing the control command. In some embodiments, performance of some functions are not obviously visible to the user, and the execution of the control command also causes the second home appliance to send back a feedback confirmation signal or error signal to the computing system. The computing system optionally sends the feedback confirmation and error signal to the first home appliance, and have the first home appliance output it to the user. In some embodiments, instead of sending the feedback confirmation or error signal to the first home appliance, the computing system optionally generating an AR or VR experience for the user to experience using a heads-up google. For example, showing the user's virtual hand turning off the oven to the user via a virtual reality or augmented reality goggles.

Figure 5:
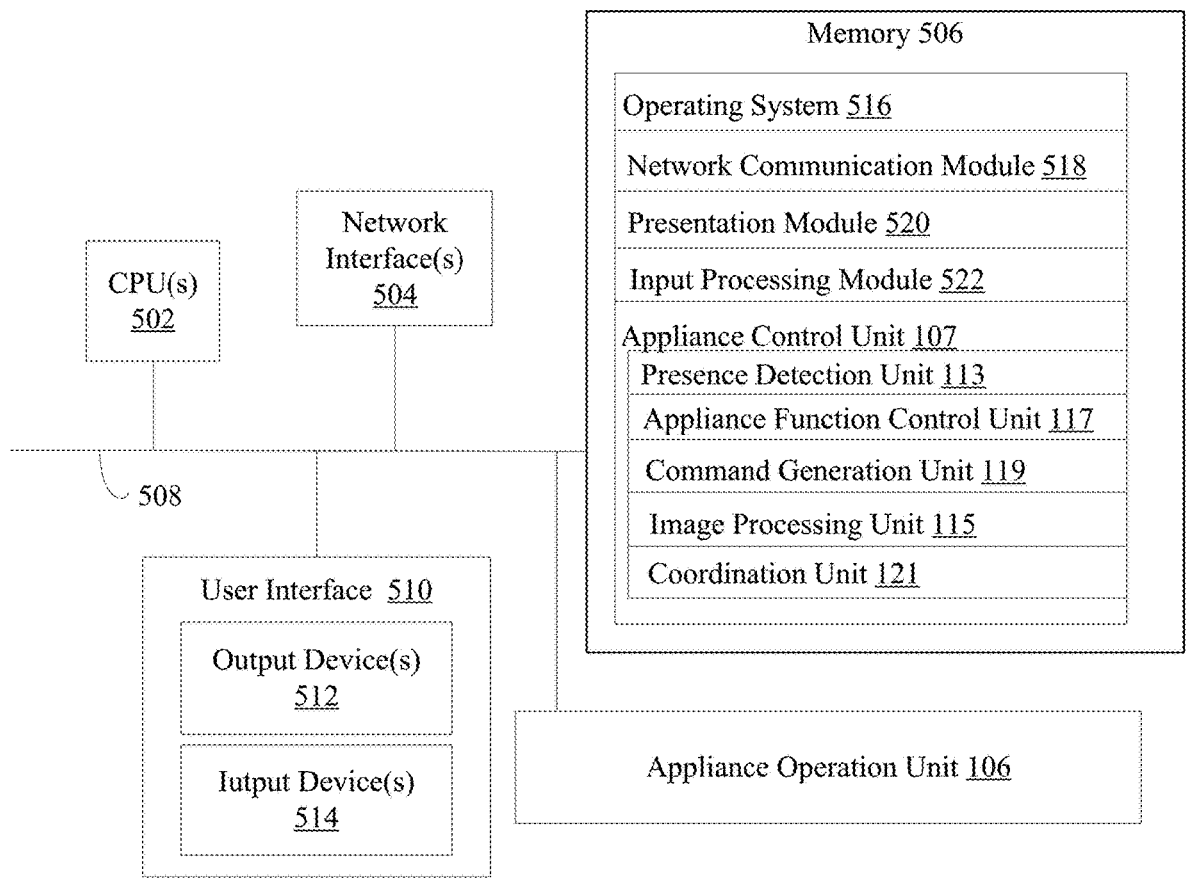
FIG. 5 is a block diagram of a computing system in accordance with some embodiments.

FIG. 5 is a block diagram illustrating a representative appliance 124. The appliance 124 includes one or more processing units (CPUs) 502, one or more network interfaces 504, memory 506, and one or more communication buses 508 for interconnecting these components (sometimes called a chipset). Appliance 124 also includes a user interface 510. User interface 510 includes one or more output devices 512 that enable presentation of media content, including one or more speakers and/or one or more visual displays. User interface 510 also includes one or more input devices 514, including user interface components that facilitate user input such as a keyboard, a mouse, a voice-command input unit or microphone, a touch screen display, a touch-sensitive input pad, a gesture capturing camera, or other input buttons or controls. In some embodiments, appliance 124 further includes sensors, which senses operating environment information of the appliance 124. Sensors include but are not limited to one or more microphones, one or more cameras, an ambient light sensor, one or more accelerometers, one or more gyroscopes, a GPS positioning system, a Bluetooth or BLE system, a temperature sensor, humidity sensors, one or more motion sensors, one or more biological sensors (e.g., a galvanic skin resistance sensor, a pulse oximeter, and the like), and other sensors. Furthermore, the appliance 124 includes appliance operation unit 106. Memory 506 includes high-speed random access memory, such as DRAM, SRAM, DDR RAM, or other random access solid-state memory devices; and, optionally, includes non-volatile memory, such as one or more magnetic disk storage devices, one or more optical disk storage devices, one or more flash memory devices, or one or more other non-volatile solid state storage devices. Memory 506, optionally, includes one or more storage devices remotely located from one or more processing units 502. Memory 506, or alternatively the non-volatile memory within memory 506, includes a non-transitory computer readable storage medium. In some implementations, memory 506, or the non-transitory computer readable storage medium of memory 506, stores the following programs, modules, and data structures, or a subset or superset thereof:

operating system 516 including procedures for handling various basic system services and for performing hardware dependent tasks;

network communication module 518 for connecting appliance 124 to other computing devices (e.g., a server system 108) or mobile control devices (e.g., smart phones or tablets) connected to one or more networks via one or more network interfaces 504 (wired or wireless);

presentation module 520 for enabling presentation of information;

input processing module 522 for detecting one or more user inputs or interactions from one of the one or more input devices 514 and interpreting the detected input or interaction;

appliance control unit 107, which controls the appliance 124, including but not limited to presence detection unit 113, appliance function control unit 117, image processing unit 115, command generation unit 119, and coordination unit 121, and other modules for performing other functions set forth herein.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 506, optionally, stores a subset of the modules and data structures identified above. Furthermore, memory 506, optionally, stores additional modules and data structures not described above.

While particular embodiments are described above, it will be understood it is not intended to limit the application to these particular embodiments. On the contrary, the application includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

What is claimed is:

1. A method of controlling home appliances via motion gestures, comprising:
   at a computing system having one or more processors and memory:
      receiving, from a first home appliance of a plurality of home appliances, a first request to start video image processing for detecting a motion gesture of a user, wherein each of the plurality of home appliances is associated with a respective set of valid control gestures;
      in response to receiving the first request to start video image processing for detecting the motion gesture of the user, processing a sequence of image frames that are captured by a camera corresponding to the first home appliance to identify a first motion gesture based on spatiotemporal features extracted from the sequence of image frames;
      selecting a second home appliance from the plurality of home appliances as a target home appliance for the first motion gesture in accordance with one or more target selection criteria, including:
         determining a subset of home appliances among the plurality of home appliances that have valid control gestures matching the first motion gesture identified from the sequence of image frames with at least a threshold level of confidence value, wherein the subset of home appliances includes two or more home appliances; and
         selecting the second home appliance from the plurality of home appliances as the target home appliance for the first motion gesture in accordance with a determination that the second home appliance has a highest combined score based on matching confidence value between the valid control gestures of the subset of home appliances and a first control gesture and a distance away from the user, wherein a location of the user is determined relative to the first home appliance; and
      generating a first control command to control the second home appliance in accordance with the first control gesture corresponding to the second home appliance.

2. The method of claim 1, wherein the first request to start video image processing for detecting the motion gesture of the user is generated by the first home appliance in response to a predefined sound input detected by the first home appliance.

3. The method of claim 1, including:
   in response to receiving the first request to start video image processing for detecting the motion gesture of the user, processing the sequence of image frames that are captured by the camera corresponding to the first home appliance to identify a second motion gesture based on spatiotemporal features extracted from the sequence of image frames, wherein the second motion gesture is identified before the first motion gesture, and the second motion gesture corresponds to an identifier of the second home appliance.

4. The method of claim 1, including:
   in addition to receiving the first request to start video image processing for detecting the motion gesture of the user from the first home appliance, receiving, from a third home appliance of the plurality of home appliances, a second request to start video image processing for detecting the motion gesture of the user, wherein the first request and the second request were received at substantially a same time.

5. A computing system, comprising:
   one or more processors; and
   memory storing instructions, the instructions, when executed by the one or more processors, cause the processors to perform operations comprising:
      receiving, from a first home appliance of a plurality of home appliances, a first request to start video image processing for detecting a motion gesture of a user, wherein each of the plurality of home appliances is associated with a respective set of valid control gestures;
      in response to receiving the first request to start video image processing for detecting the motion gesture of the user, processing a sequence of image frames that are captured by a camera corresponding to the first home appliance to identify a first motion gesture based on spatiotemporal features extracted from the sequence of image frames;

selecting a second home appliance from the plurality of home appliances as a target home appliance for the first motion gesture in accordance with one or more target selection criteria, including:

determining a subset of home appliances among the plurality of home appliances that have valid control gestures matching the first motion gesture identified from the sequence of image frames with at least a threshold level of confidence value, wherein the subset of home appliances includes two or more home appliances; and selecting the second home appliance from the plurality of home appliances as the target home appliance for the first motion gesture in accordance with a determination that the second home appliance has a highest combined score based on matching confidence value between the valid control gestures of the subset of home appliances and a first control gesture and a distance away from the user, wherein a location of the user is determined relative to the first home appliance; and generating a first control command to control the second home appliance in accordance with the first control gesture corresponding to the second home appliance.

6. The computing system of claim 5, wherein the first request to start video image processing for detecting the motion gesture of the user is generated by the first home appliance in response to a predefined sound input detected by the first home appliance.

7. The computing system of claim 5, wherein the operations include:

in response to receiving the first request to start video image processing for detecting the motion gesture of the user, processing the sequence of image frames that are captured by the camera corresponding to the first home appliance to identify a second motion gesture based on spatiotemporal features extracted from the sequence of image frames, wherein the second motion gesture is identified before the first motion gesture, and the second motion gesture corresponds to an identifier of the second home appliance.

8. The computing system of claim 5, wherein the operations include:

in addition to receiving the first request to start video image processing for detecting the motion gesture of the user from the first home appliance, receiving, from a third home appliance of the plurality of home appliances, a second request to start video image processing for detecting the motion gesture of the user, wherein the first request and the second request were received at substantially a same time.

9. A non-transitory computer-readable storage medium storing instructions, the instructions, when executed by one or more processors, cause the processors to perform operations comprising:

receiving, from a first home appliance of a plurality of home appliances, a first request to start video image processing for detecting a motion gesture of a user, wherein each of the plurality of home appliances is associated with a respective set of valid control gestures;

in response to receiving the first request to start video image processing for detecting the motion gesture of the user, processing a sequence of image frames that are captured by a camera corresponding to the first home appliance to identify a first motion gesture based on spatiotemporal features extracted from the sequence of image frames;

selecting a second home appliance from the plurality of home appliances as a target home appliance for the first motion gesture in accordance with one or more target selection criteria, including:

determining a subset of home appliances among the plurality of home appliances that have valid control gestures matching the first motion gesture identified from the sequence of image frames with at least a threshold level of confidence value, wherein the subset of home appliances includes two or more home appliances; and selecting the second home appliance from the plurality of home appliances as the target home appliance for the first motion gesture in accordance with a determination that the second home appliance has a highest combined score based on matching confidence value between the valid control gestures of the subset of home appliances and a first control gesture and a distance away from the user, wherein a location of the user is determined relative to the first home appliance; and generating a first control command to control the second home appliance in accordance with the first control gesture corresponding to the second home appliance.

10. The computer-readable storage medium of claim 9, wherein the first request to start video image processing for detecting the motion gesture of the user is generated by the first home appliance in response to a predefined sound input detected by the first home appliance.

11. The computer-readable storage medium of claim 9, wherein the operations include:

in response to receiving the first request to start video image processing for detecting the motion gesture of the user, processing the sequence of image frames that are captured by the camera corresponding to the first home appliance to identify a second motion gesture based on spatiotemporal features extracted from the sequence of image frames, wherein the second motion gesture is identified before the first motion gesture, and the second motion gesture corresponds to an identifier of the second home appliance.

12. The computer-readable storage medium of claim 9, wherein the operations include:

in addition to receiving the first request to start video image processing for detecting the motion gesture of the user from the first home appliance, receiving, from a third home appliance of the plurality of home appliances, a second request to start video image processing for detecting the motion gesture of the user, wherein the first request and the second request were received at substantially a same time.

* * * * *